US009625670B2

(12) United States Patent
Chen et al.

(10) Patent No.: US 9,625,670 B2
(45) Date of Patent: Apr. 18, 2017

(54) AIR JETTED MICRO-CABLE WITH SUPER LOW RESISTANCE AND DRAMATICALLY IMPROVED FOR AIR BLOCKAGE

(71) Applicant: Verizon Patent and Licensing Inc., Arlington, VA (US)

(72) Inventors: David Z. Chen, Richardson, TX (US); Christina M. Colasanto, New Ipswich, NH (US); Patrick B. Anderson, Woodstock, MD (US); Christopher D. Levendos, Yonkers, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 300 days.

(21) Appl. No.: 14/222,197

(22) Filed: Mar. 21, 2014

(65) Prior Publication Data

US 2015/0268437 A1    Sep. 24, 2015

(51) Int. Cl.
*G02B 6/44* (2006.01)
*H02G 3/04* (2006.01)

(52) U.S. Cl.
CPC ......... *G02B 6/4464* (2013.01); *G02B 6/4438* (2013.01)

(58) Field of Classification Search
CPC ... G02B 6/4464; G02B 6/4485; G02B 6/4438
USPC ......................................... 385/104; 174/68.3
See application file for complete search history.

(56) References Cited

U.S. PATENT DOCUMENTS

| | | | | |
|---|---|---|---|---|
| 3,680,753 A * | 8/1972 | Shaw-Stewart | ...... | B65H 59/384 226/195 |
| 4,012,577 A * | 3/1977 | Lang | ...... | H01B 11/02 174/117 F |
| 4,740,054 A * | 4/1988 | Becker | ...... | G02B 6/4416 174/70 R |
| 7,604,435 B2 * | 10/2009 | Mjelstad | ...... | D07B 1/12 174/113 C |
| 2002/0053460 A1 * | 5/2002 | Takeda | ...... | G02B 6/4416 174/117 F |
| 2004/0042743 A1 * | 3/2004 | Konstadinidis | ...... | G02B 6/4438 385/100 |
| 2006/0104579 A1 * | 5/2006 | Fitz | ...... | G02B 6/4495 385/103 |
| 2007/0280611 A1 * | 12/2007 | Dyer | ...... | G02B 6/4427 385/104 |
| 2009/0087153 A1 * | 4/2009 | Weiss | ...... | G02B 6/4438 385/113 |
| 2012/0063731 A1 * | 3/2012 | Fitz | ...... | G02B 6/4495 385/104 |
| 2012/0315003 A1 * | 12/2012 | Mogensen | ...... | G02B 6/4459 385/100 |
| 2014/0119699 A1 * | 5/2014 | Keller | ...... | G02B 6/443 385/102 |
| 2014/0353561 A1 * | 12/2014 | Chen | ...... | G02B 6/4465 254/134.4 |

* cited by examiner

*Primary Examiner* — Sherman Ng

(57) ABSTRACT

A cable, and method and system for deploying the cable are described. The cable includes a jacket having a plurality of outer grooves formed on its outer surface. The cable can be deployed by blowing it through a microduct using a jetting apparatus. The outer grooves allow the cable to be deployed over extended distance by allow improved airflow between the first and second ends of the microduct.

16 Claims, 5 Drawing Sheets

AIR JETTED MICRO-CABLE WITH SUPER LOW RESISTANCE AND DRAMATICALLY IMPROVED FOR AIR BLOCKAGE

BACKGROUND INFORMATION

As technology advances, it becomes necessary to continually upgrade existing infrastructures in order to keep up with consumer demands for the latest features and services. One such infrastructure upgrade involves migration of voice and data communication services from metal (e.g., copper, aluminum, coaxial, etc.) to optical fiber (also referred to as fiber optics or simply fiber), as well as improvements in existing optical fiber lines. In order to upgrade the infrastructure in this manner, it is necessary to first deploy the optical fiber cable from central hubs to various locations such as office buildings, apartment buildings, and single/multi-family homes. It is therefore necessary to deploy the optical fiber lines underground and/or remove legacy cables. Additionally, installation within buildings requires passage of the optical fiber cables within existing structures, often without disturbing visible walls. This often involves complicated routes having numerous turns.

Optical fiber cables, however, are more delicate than legacy cables, and more difficult to deploy. The cables must first be routed through streets from central locations to different buildings. Once inside a building, the optical fiber cable must be routed through multiple curves and turns prior to reaching a desired location. Oftentimes, it is necessary to route the optical fiber cable through a duct, such as a microduct, using specialized machinery. The multiple curves can result in increased friction between the optical fiber cable and the duct, thereby limiting the distance that the optical fiber can be deployed before the machinery must be moved forward to continue deployment.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF PREFERRED EMBODIMENTS

A cable, and method and system for deploying the cable are described. In the following description, for the purposes of explanation, numerous specific details are set forth in order to provide a thorough understanding of the present invention. As is well known, the present invention may be practiced without these specific details or with an equivalent arrangement. In other instances, well-known structures and devices are shown in block diagram form in order to avoid unnecessarily obscuring the present invention.

Figure 1:
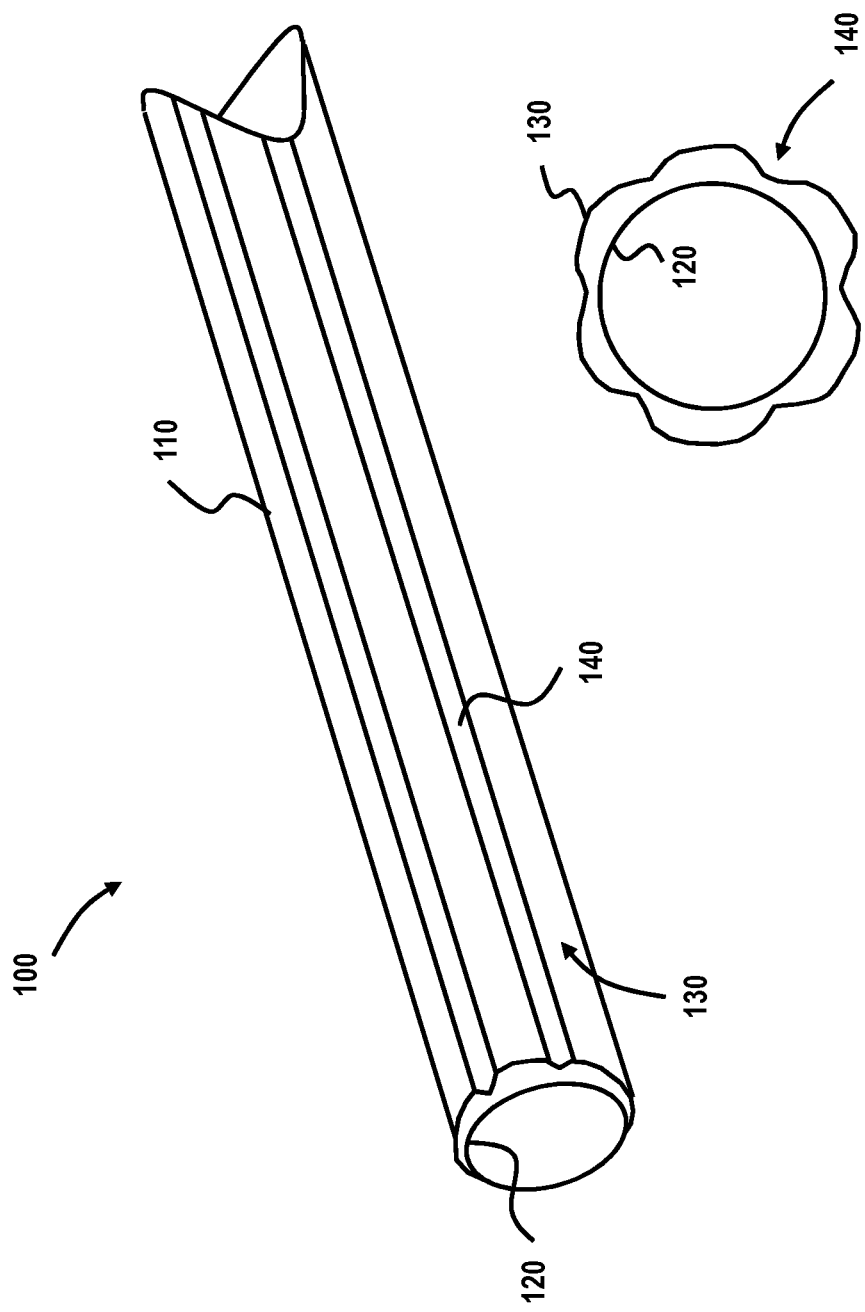
FIG. 1 is a diagram of a cable, according to one embodiment.

FIG. 1 illustrates a cable 100, such as a micro-cable or optical fiber cable, in accordance with at least one embodiment. The cable 100 includes a jacket 110 having a generally hollow interior. The interior of the jacket 110 can be configured for receiving various items therein. For example, according to at least one embodiment, one or more optical fiber signal lines can be disposed within the jacket 110. Such optical fiber signal lines can be used for the transmission of data, voice, control signals, etc. through the cable. For example, data signals can be supplied to consumers desiring to can utilize services for providing music and video, internet browsing, etc. It should be noted that the cable 100 illustrated in FIG. 1 is not limited to optical fiber. Rather, the cable 100 can be copper, aluminum, etc.

The jacket 110 further includes an inner surface 120 and an outer surface 130. As illustrated in FIG. 1, the outer surface 130 contains a plurality of outer grooves 140 that are formed in such a manner as to extend into the jacket 110 in a direction of the inner surface 120. The outer grooves 140 can have various configurations such as, for example, a cross-sectional pattern of convex shapes, v-grooves, etc. As will be discussed in greater detail below, the outer grooves 140 assist in improving deployment of the cable 100 through conduits such as a microduct.

As illustrated in FIG. 1, the outer grooves 140 extend along the entire length of the jacket 110. Furthermore, the outer grooves 140 are circumferentially disposed on the outer surface 130 of the jacket 110. Although FIG. 1 illustrates a symmetrical arrangement of the outer grooves 140, it should be noted that such symmetry is not required. Rather, the outer grooves 140 can be formed in any type of pattern, including non-symmetrical patterns. Similarly, the number of outer grooves 140 can vary depending on the size of the cable or other factors.

As illustrated in FIG. 1, the outer grooves 140 only occupy a portion of the outer surface 130 of the jacket 110. Thus, according to an embodiment, markings identifying the cable 100 and its specification can still be provided on the outer surface 130 of the jacket 110. Furthermore, the outer grooves 140 can assist in visually inspecting the cable 100 for twisting. More particularly, the outer grooves 140 extend in a straight line along the outer surface 130 of the jacket. Visual inspection of the cable 110 can therefore provide an indication of the amount of twisting which occurs based on curvature of the outer grooves 140. Furthermore, the outer grooves 140 can assist in preventing kinks that may damage the cable 100 or cause optical fiber signal lines within the cable to break.

According to at least one embodiment, the outer grooves 140 assist in deployment of the cable 100 by allowing a consistent and continuous flow of air through the microduct while deploying the cable 100 using, for example, a jetting apparatus. More particularly, during deployment of the cable 100, it is often the case that the microduct must be passed through various obstacles which cause varying degrees of curvature at different directions, as well as elevation changes. Such changes in the microduct result in establishment of contact areas between the outer surface 130 of the jacket 110 and the inner surface of the microduct. As the cable 100 encounters increasing changes in direction, contact with the microduct also increases. Over extended length of deployment, sufficient contact can be established between the cable 100 and the microduct, thus resulting in a decrease, or complete blockage, in the flow of air through the microduct.

Figure 2:
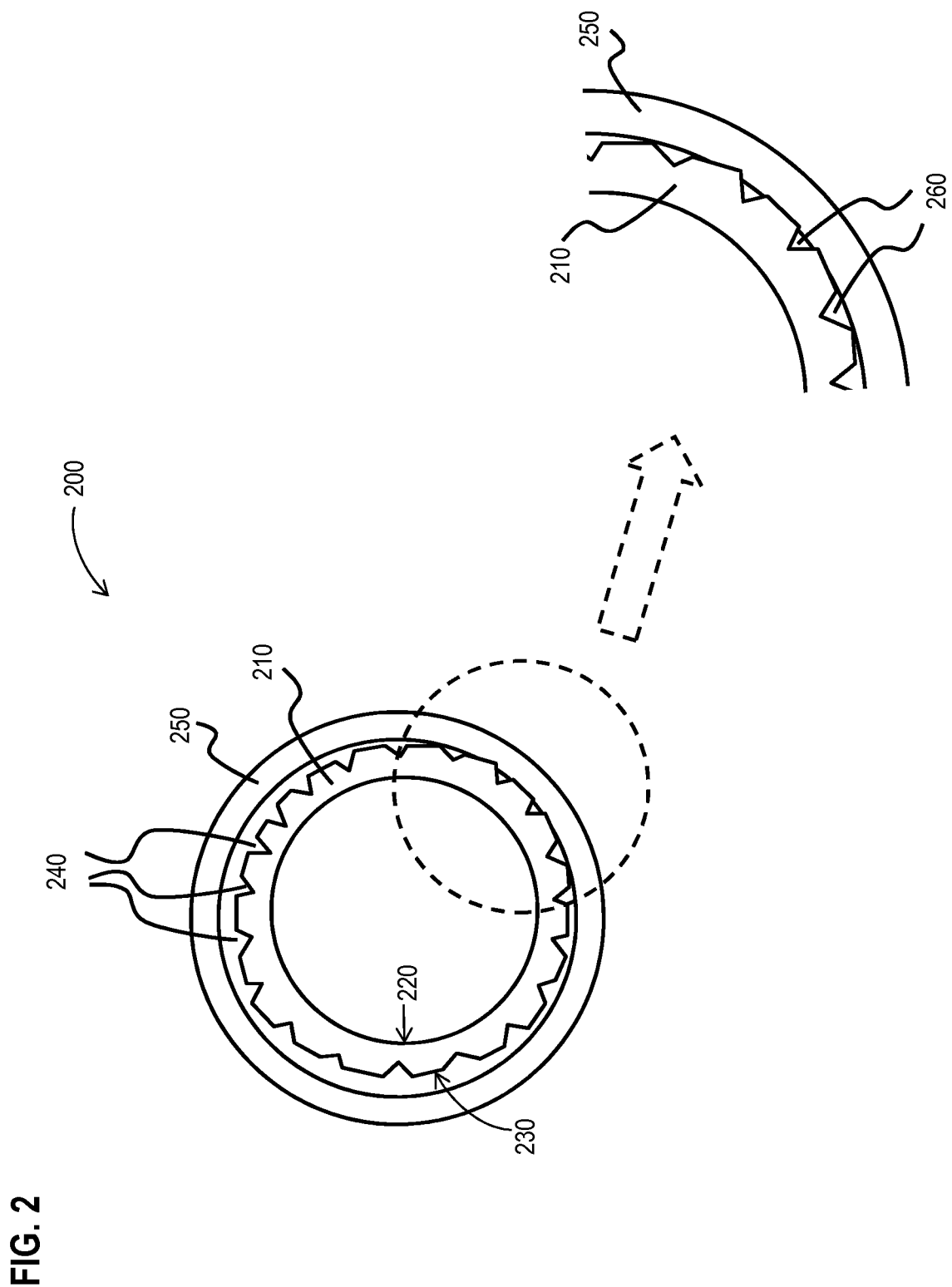
FIG. 2 is a cross-sectional diagram of deployment configuration consisting of a cable within a duct, according to one embodiment.

According to various embodiments, the flow of air through the microduct can be maintained throughout the deployment route regardless of the level of contact between the microduct and the cable. Referring to FIG. 2, a cross-section of deployment configuration 200 consisting of a cable 210 disposed within a microduct 250 in accordance with one embodiment is illustrated. As can be seen, the outer surface 230 of the cable 210 makes contact with a portion of the inner surface of the microduct 250. Such contact can be formed as a result of a curve and/or bend occurring along the deployment path. Accordingly, multiple contact areas will typically occur when the deployment path included multiple turns.

Within the section forming the contact patch, however, the flow of air is not blocked due to the outer grooves 240 formed on the outer surface 230 of the cable 210. More particularly, although a portion of the outer surface 230 of the cable 210 contacts the microduct 250, multiple airflow passages 260 are created within the space defined by the outer grooves 240 and the inner surface of the microduct 250. Accordingly, a continuous flow of air can be maintained throughout extended deployment distances by means of the airflow passages 260. In addition, air can pass freely in areas where the cable 210 is not in contact with the microduct 250. According to one or more embodiments, as the cable 210 continues to be deployed within the microduct 250, the airflow is maintained in a continuous manner regardless of the amount of contact formed between the cable 210 and the microduct 250 over the length of deployment.

As can be appreciated, during deployment of the cable 210 within the microduct 250, the airflow, in part, forces the cable 210 along the deployment route. Accordingly, by providing a configuration wherein the cable 210 contains a plurality of outer grooves 240, the airflow can be maintained in a substantially continuous manner. This allows the cable 210 to be deployed over a greater range within a single microduct 250.

According to one or more embodiments, the cable 210 can also be deployed within microducts 250 having lower tolerances. Since the outer grooves 240 create airflow passages 260 that allow a continuous flow of air, the airflow can be maintained in a continuous manner regardless of level of contact with the microduct 250 over the deployment range. Furthermore, according to at least one embodiment, the flow of air can be significantly increased to the point of forming a floatation layer (not shown) between the cable 210 and the microduct 250. More particularly, as the airflow is increased, the aerodynamic effects cause the cable 210 to be lifted by the flowing air such that the cable 210 no longer contacts the microduct 250. Rather, the cable 210 effectively "floats" on the layer of air flowing between microduct 250 and the cable 210. Such an embodiment can allow the cable 210 to be deployed over greater distances due to the reduction in friction.

Figure 3:
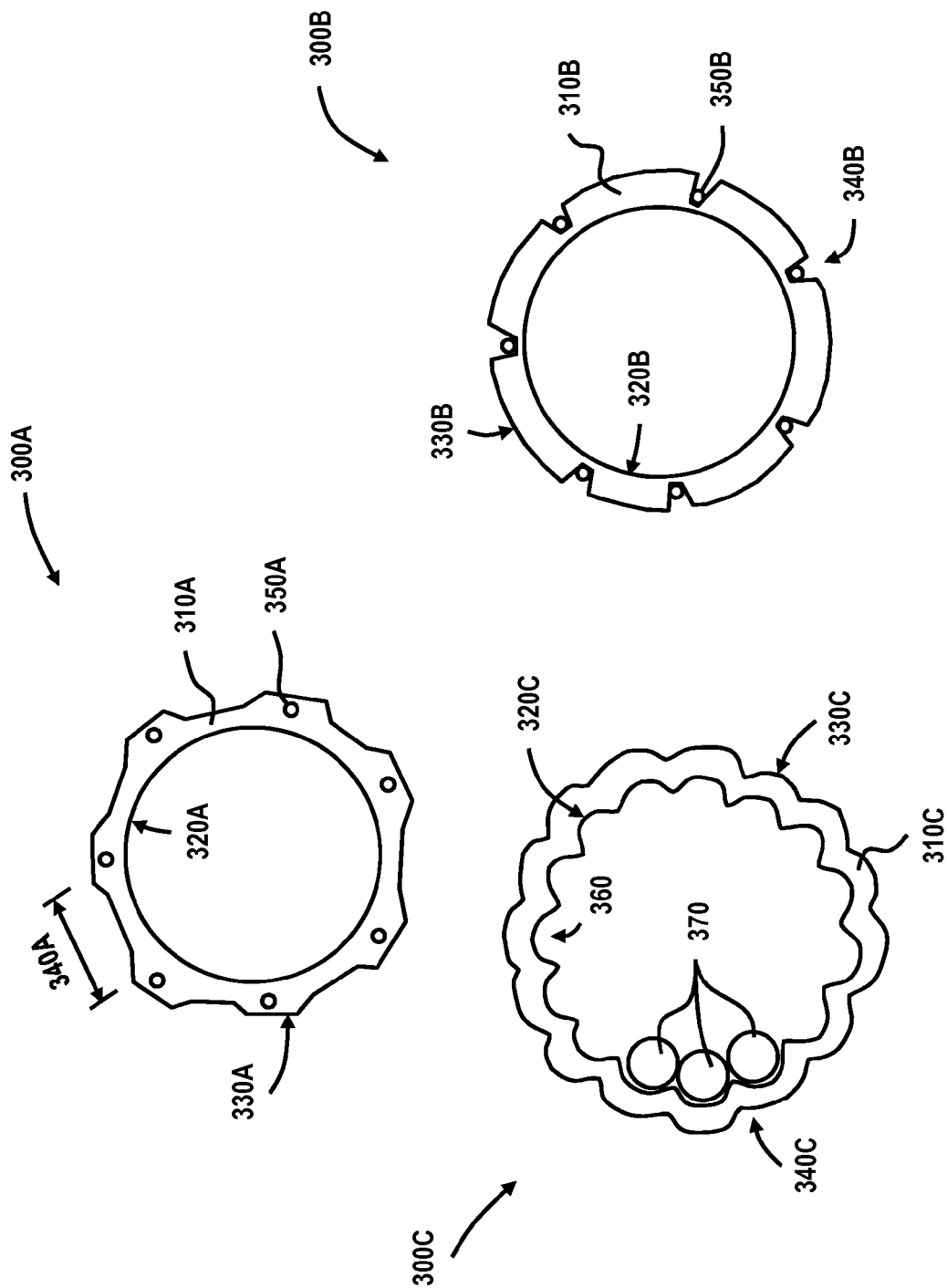
FIG. 3 illustrates cross-sectional diagrams of cables, according to alternative embodiments.

FIG. 3 illustrates cross-sectional diagrams of cables in accordance with different embodiments. The first cable 300A includes a jacket 310A having an inner surface 320A and an outer surface 330A. A plurality of conductors 350A are inserted within the jacket 310A and at a location proximate to the outer surface 330A. As illustrated in FIG. 2, the conductors 350A cause formation of protrusions on the outer surface 330A of the jacket 310A. Thus, according to such an embodiment, the outer grooves 340A become defined by the spaces formed between adjacent protrusions.

According to an embodiment, the conductors 350A can be used to provide various features and functions to the cable 300A. For example, conventional cables having one or more optical fiber signal lines disposed within the jacket typically do not include a source of power or grounding. Rather, such cables contain optical fiber signal lines that are used purely for transmission of data, voice, and/or signals. It is often the case, however that such cables will be used in a capacity which also requires power and/or grounding. According to at least one embodiment, the conductors 350A can be used for grounding, power transmission, or both. In addition, the conductors 350A can be used to carry one or more signals that can be used to generate different ring tone frequencies.

FIG. 3 also illustrates another cable 300B in accordance with an embodiment. The cable 300B includes a jacket 310B having an inner surface 320B and an outer surface 330B. The outer surface 330B includes a plurality of outer grooves 340B having a generally v-shaped configuration. The outer grooves 340B also extend along the entire length of the jacket 310B. One or more conductors 350B are also disposed within the outer grooves 340B. According to such an embodiment, the outer grooves 340B can be sized such that they are capable of securely retaining each conductor 350B therein. According to other embodiments, the conductors 350B can also be bonded within the outer grooves 340B in order to provide additional security. Additionally, the conductors 350B can be used for various purposes including, but not limited to, grounding, supplying power, generating one or more ring tone frequencies, or various combinations of such features.

With continued reference to FIG. 3, another cable 300C is illustrated in accordance with an embodiment. The cable 300C includes a jacket 310C having an inner surface 320C and an outer surface 330C. The outer surface 330C also contains a plurality of outer grooves 340C which extend over the entire length of the jacket 310C. As previously discussed, various embodiments can provide outer grooves having different configurations, such as, convex, symmetrical, non-symmetrical, etc. According to other embodiments, however, the inner surface 320C of the jacket 310C can also contain a plurality of inner grooves 360 formed thereon. According to at least one embodiment, the inner grooves 360 can be formed such that they have a similar shape and pattern as the outer grooves 340C. However, the inner grooves 360 can have different patterns and configurations from the outer grooves 340C. According to at least one embodiment, the inner grooves 360 can be sized and configured based on the items that will be disposed within the jacket 310C. For example, if optical fiber signal lines 370 of a specific diameter will be disposed within the jacket 310C, then the inner grooves 360 can be formed in a concave manner with proportions which match the diameter of the optical fiber signal lines 370. As illustrated in FIG. 3, such an embodiment can improve packing of the optical fiber signal lines 370, by a stabilizing their placement when contacting the jacket 310C, while also eliminating spaces that would be conventionally formed between adjacent optical fibers and the inner surface of the jacket.

Figure 4:
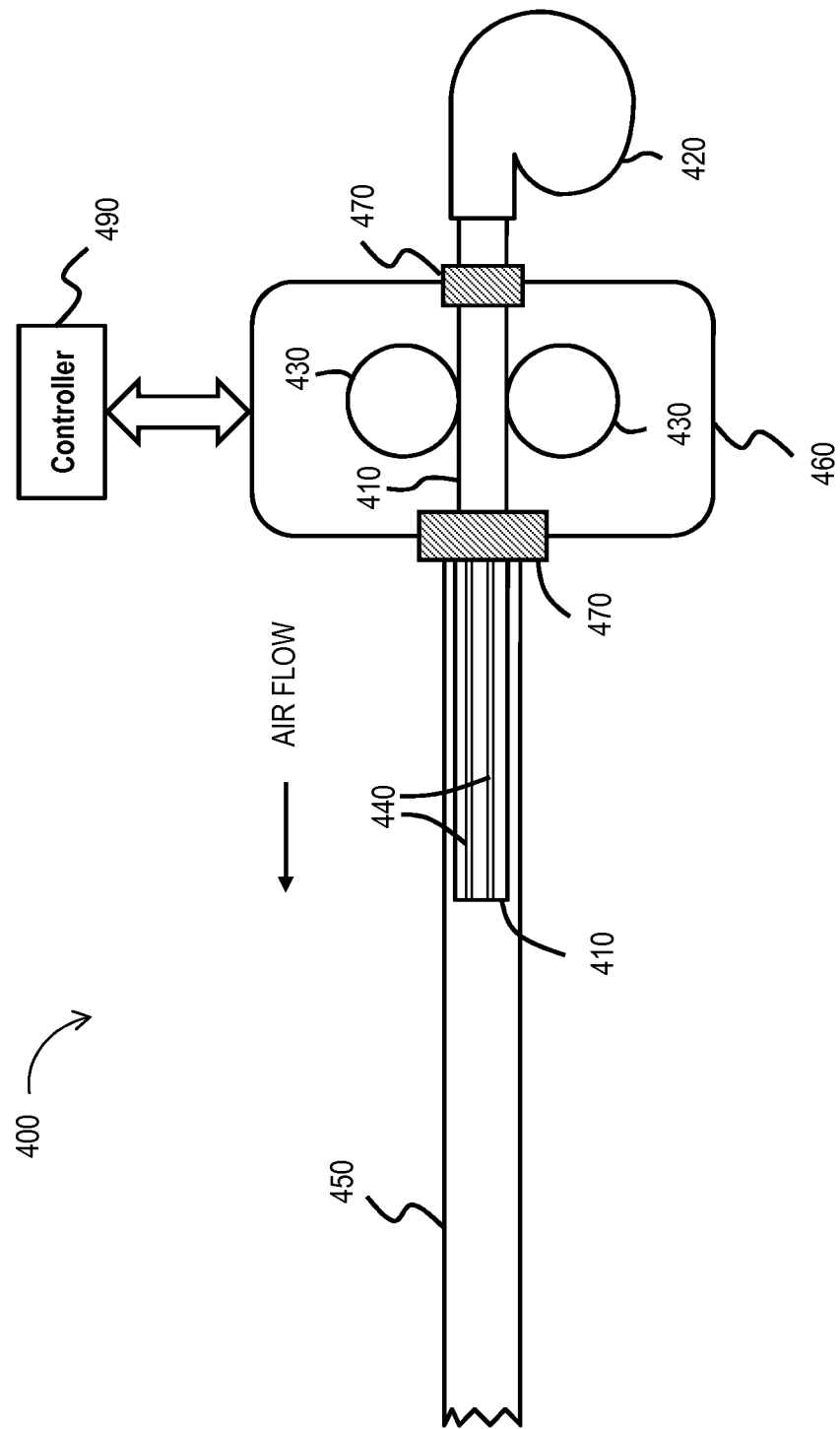
FIG. 4 illustrates a system for deploying cables constructed in accordance with one embodiment.

FIG. 4 illustrates an arrangement, such as a jetting apparatus 400, for deploying a cable 410 constructed in accordance with at least one embodiment. By way of example, such a jetting apparatus 400 can include a cable dispenser 420 which houses a spool of the necessary cable 410 and one or more rollers 430 to feed the cable 410 through the microduct 450. The rollers 430 are contained in a housing 460 which is pressurized to generate an air jet into the microduct 450. One or more seals 470 can be provided to maintain a required pressure as air is blown into the microduct 450. Furthermore, although not shown in the FIG. 4, a restrictor can also be provided at the exit, of the microduct 450 in order to maintain a desired pressure and air flow.

According to at least one embodiment, a controller 490 can be provided for monitoring operation of the jetting apparatus 400. The controller 490 can be used, for example to monitor the air pressure housing 460 and microduct 450 in order to facilitate continuous deployment of the cable 410. Furthermore, the controller 490 can control operation of the rollers 430 and dispenser 420 to vary the speed at which cable 410 is dispensed. According to an embodiment, the controller 490 can control operation of the jetting apparatus 400 so that the cable 410 is dispensed at a velocity that is appropriate for the air pressure. For example, if the air pressure and/or velocity within the microduct 450 drops below a predetermined level, it may be necessary to decrease the rate of deployment for the cable 410. Alternatively, it may be necessary to increase the airflow and pressure. Although a controller 490 is illustrated in FIG. 4, it should be noted that various other devices, such as a personal computer, laptop, special purpose computing unit, etc. can be programmed and configured for appropriately controlling operation of the jetting apparatus 400.

Figure 5:
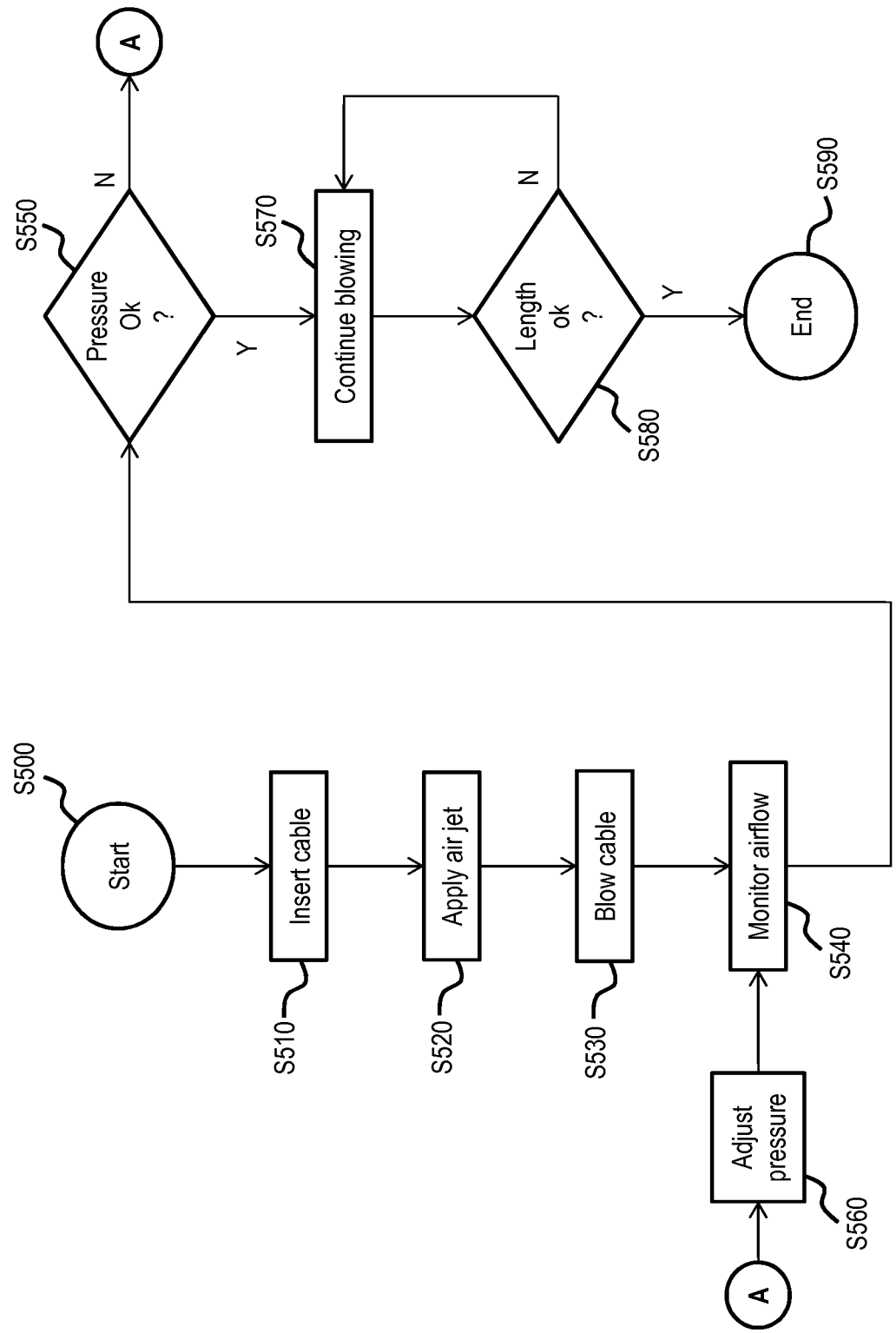
FIG. 5 is a flowchart illustrating a process for deploying cables, according to one embodiment.

FIG. 5 is a flowchart illustrating a process for deploying a cable 410 through a microduct 450 in accordance with at least one embodiment. The process begins at S500, wherein, for example, the jetting apparatus 400 is attached to the microduct 450 and the cable 410 is loaded into the cable dispenser 420. Furthermore, additional preparatory steps such as, for example, selection of appropriate cable size, safety inspections, etc. can also be performed.

At S510, one and of the cable 410 is inserted into the microduct 450. As previously discussed, a jetting apparatus 400 can be used for blowing and/or pushing the cable 410 through the microduct 450. At S520, the jetting apparatus 400 is operated in order to apply an air jet at a predetermined pressure through a first end of the microduct 450. As previously discussed, various embodiments provide a cable 410 containing one or more outer grooves 440. The outer grooves 440 allow improved airflow through the microduct 450 and around the cable 410. Furthermore, if the cable 410 contacts the microduct 450 airflow passages 260 (see FIG. 2) are created so that airflow is maintained.

At S530, the jetting apparatus 400 blows the cable through the duct with the assistance of the airflow and/or a pushing force on the cable 410. The pushing force can be created, for example, by the rollers 430. At S540, the airflow is monitored in order to ensure that the correct amount of air and/or pressure is being supplied by the jetting apparatus 400. The airflow can be monitored, for example, by the controller 410. According to one or more embodiments, the airflow can be continuously monitored and adjusted to maintain desired values. According to other embodiments, the airflow can be monitored at specific intervals or through manual operations.

At S550, it is determined whether the pressure generated by the airflow, or the airflow itself, is sufficient for the particular deployment operation or the specific cable 410 being deployed. If the pressure is insufficient, for example, based on the amount of cable 410 that has already been deployed, the pressure being supplied by the jetting apparatus 400 is adjusted at S560 until an appropriate level is achieved. The pressure can therefore be increased or decreased, depending on the particular condition detected, in order to optimize the airflow. According to an embodiment, the controller 490 can be operatively connected to the jetting apparatus 400 in order to regulate the airflow and/or pressure, as well as the rate of speed at which the cable 410 is being deployed. Once the pressure has been increased or adjusted, the process returns to S550 where the airflow is again monitored.

If the pressure is determined to be at the required operative level, then control passes to S570 where the jetting apparatus 400 continues to apply the air jet and blowing the cable 410 through the microduct 450. At S580, it is determined whether a desired length of the cable 410 has been deployed through the microduct 450. As previously discussed, the controller 490 can be used to control various features of the jetting apparatus 400. According to at least one embodiment, the controller 490 can also monitor the length of cable 410 that has been dispensed through the microduct 450 and compares this length to a predetermined value. If the desired length (or predetermined value) has not been reached, then control returns to S570 where the jetting apparatus 400 continues to blow the cable 410 through the microduct 450. According to one or more embodiments, control can also return to S540 where the airflow is again monitored prior to checking the pressure. Alternatively, if it is determined that the desired length of cable 410 has been deployed, then control passes to S590 where the process ends.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A cable comprising:
   a jacket having a hollow interior for accommodating one or more signal lines capable of transmitting data, voice, and/or control signals through the cable; and
   a plurality of outer grooves formed on an outer surface of the jacket and extending along an entire length of the cable,
   wherein, when a portion of the outer surface of the jacket contacts a duct in which the cable is deployed, a plurality of airflow passages are created within spaces defined by the plurality of outer grooves and an inner surface of the duct, and
   wherein the plurality of airflow passages are configured to allow continuous airflow around the outer surface of the jacket to facilitate deployment of the cable through the duct.

2. A cable of claim 1, further comprising:
   a plurality of conductors disposed within the plurality of outer grooves,
   wherein each of the outer grooves includes a v-shaped configuration for receiving and retaining one of the plurality of conductors.

3. A cable of claim 1, further comprising a plurality of conductors configured for grounding, supplying power, generating one or more ring tone frequencies, or a combination thereof.

4. The cable of claim 2, wherein each of the plurality of outer grooves is sized based on a size of each of the plurality of conductors.

5. The cable of claim 4, wherein each of the plurality of outer grooves is configured to securely retain one of the plurality of conductors.

6. The cable of claim 3, wherein the plurality of conductors are configured to provide grounding and supply power.

7. The cable of claim 1, wherein the cable is configured to be disposed on a spool of cable and at least one roller is configured to feed the cable through a duct.

8. The cable of claim 7, wherein the cable is configured to be pushed through the duct via air flow provided by an air supply device through the plurality of outer grooves.

9. A system comprising:
a duct having a predetermined length, an inner surface and an outer surface; and
a cable configured to be deployed in the duct, the cable comprising:
a jacket having an inner surface, an outer surface and a hollow interior for accommodating one or more signal lines capable of transmitting at least one of data, voice, or control signals through the cable, and
a plurality of outer grooves formed on the outer surface of the jacket and extending along an entire length of the cable,
wherein a first end of the cable is inserted into a first end of the duct, and
wherein the plurality of outer grooves facilitate a continuous flow of air between first and second ends of the duct,
wherein, when a portion of the outer surface of the jacket contacts the inner surface of the duct, a plurality of airflow passages are created within spaces defined by the plurality of outer grooves and the inner surface of the duct, and
wherein the plurality of airflow passages are configured to allow continuous airflow around the outer surface of the jacket to facilitate deployment of the cable.

10. The system of claim 9, further comprising:
a plurality of conductors disposed within the plurality of outer grooves,
wherein each of the outer grooves includes a v-shaped configuration for receiving and retaining one of the plurality of conductors.

11. The system of claim 10, wherein each of the plurality of outer grooves is sized based on a size of each of the plurality of conductors.

12. The system of claim 11, wherein each of the plurality of outer grooves is configured to securely retain one of the plurality of conductors.

13. The system of claim 9, wherein the cable further comprises a plurality of conductors configured for at least one of grounding, supplying power or generating one or more ring tone frequencies.

14. The system of claim 13, wherein the plurality of conductors are configured to provide grounding and supply power.

15. The system of claim 9, wherein the cable is configured to be disposed on a spool of cable and at least one roller is configured to feed the cable through the duct.

16. The system of claim 15, wherein the cable is configured to be pushed through the duct via air flow provided by an air supply device through the plurality of outer grooves.

* * * * *